United States Patent
Meagher et al.

(10) Patent No.: US 9,137,948 B2
(45) Date of Patent: Sep. 22, 2015

(54) SYSTEM AND METHOD FOR CHANGING A LID HEIGHT OF A HARVESTER

(75) Inventors: Paula Jean Minuto Meagher, Lititz, PA (US); Steven Carson Young, Lancaster, PA (US); Frank Calvin Dupire, Manheim, PA (US); Steven E. Gaedy, New Holland, PA (US); Bruce Allen Hadley, Ephrata, PA (US)

(73) Assignee: CNH Industrial America LLC, New Holland, PA (US)

( * ) Notice: Subject to any disclaimer, the term of this patent is extended or adjusted under 35 U.S.C. 154(b) by 261 days.

(21) Appl. No.: 13/554,850

(22) Filed: Jul. 20, 2012

(65) Prior Publication Data

US 2014/0025264 A1    Jan. 23, 2014

(51) Int. Cl.
  *G06F 7/00* (2006.01)
  *A01D 46/08* (2006.01)
  *A01D 41/12* (2006.01)

(52) U.S. Cl.
  CPC ............ *A01D 46/082* (2013.01); *A01D 46/084* (2013.01); *A01D 41/1208* (2013.01)

(58) Field of Classification Search
  CPC ........... A01D 41/1217; A01D 41/1226; A01D 41/127; A01D 41/145; A01D 41/148; A01D 46/08; A01D 46/20; A01D 46/082; A01D 46/084; B60P 1/00; B60P 1/64; B60P 1/6409; B60P 1/6418; B60P 1/6427; B60P 1/6436; B60P 1/6445; B60P 1/6454; B60P 1/6463; B60P 1/6472; B60P 1/6481; B60P 1/649; B65D 88/124; B65D 88/125; B65D 88/126; B65D 90/0033; B65D 90/004; B65D 90/0046; B66F 7/00; B66F 7/04; B66F 7/06; B66F 7/0633; B66F 7/0641; B66F 7/065; B66F 7/0658; B66F 7/0666; B66F 7/0675; B66F 7/0683; B66F 7/0691; B66F 7/08; B66F 7/085
  USPC .............................. 701/50; 56/10.2 E, 473, 5
  See application file for complete search history.

(56) References Cited

U.S. PATENT DOCUMENTS

| | | | |
|---|---|---|---|
| 4,519,189 A | 5/1985 | Fachini et al. | |
| 4,744,207 A | 5/1988 | Hanley et al. | |
| 4,930,297 A | 6/1990 | Schlueter et al. | |
| 5,616,077 A | 4/1997 | Covington et al. | |
| 6,263,650 B1 * | 7/2001 | Deutsch et al. | 56/16.4 B |
| 6,409,456 B1 | 6/2002 | Horejsi et al. | |
| 6,443,836 B1 | 9/2002 | Horejsi et al. | |
| 7,320,209 B2 | 1/2008 | Covington et al. | |
| 7,520,116 B2 | 4/2009 | McCasky et al. | |
| 2013/0158813 A1 * | 6/2013 | McCully et al. | 701/50 |

* cited by examiner

*Primary Examiner* — Jerrah Edwards
(74) *Attorney, Agent, or Firm* — Patrick M. Sheldrake; Seyed V. Sharifi T.

(57) ABSTRACT

A harvester includes a crop receiver configured to receive agricultural material. The crop receiver includes a lid to cover a portion of the crop receiver. The harvester also includes a frame assembly coupled to the lid of the crop receiver. The harvester includes an actuator coupled to the frame assembly and configured to be controlled to adjust a vertical height of the lid. The harvester also includes a sensor coupled to the frame assembly and configured to indicate whether the lid is positioned at a first vertical height or a second vertical height. The harvester includes control circuitry coupled to the sensor and configured to instruct the actuator to move the lid of the crop receiver between the first vertical height and the second vertical height based at least partly on an indication from the sensor.

18 Claims, 7 Drawing Sheets

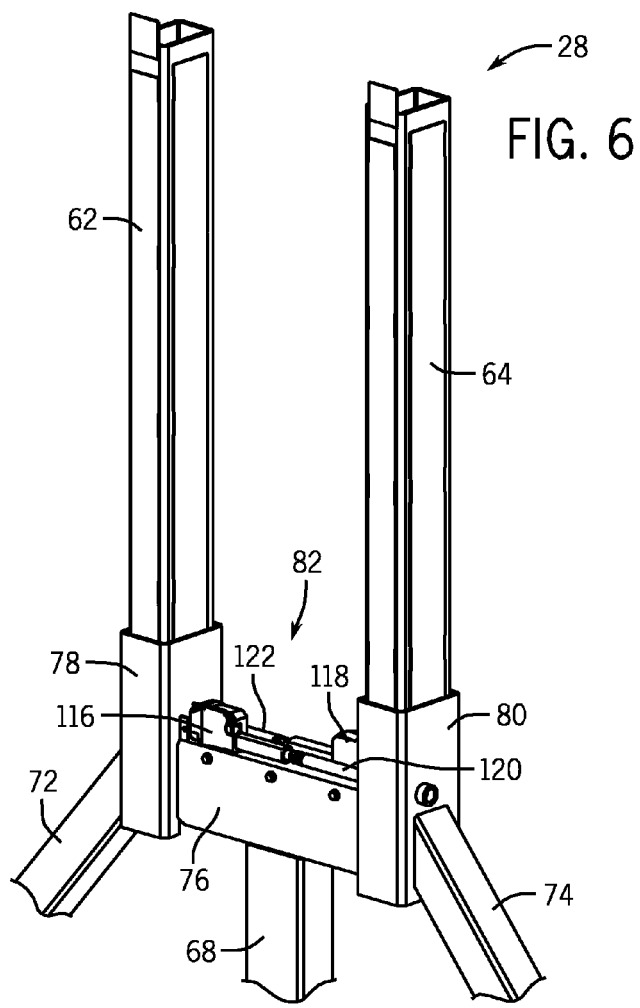
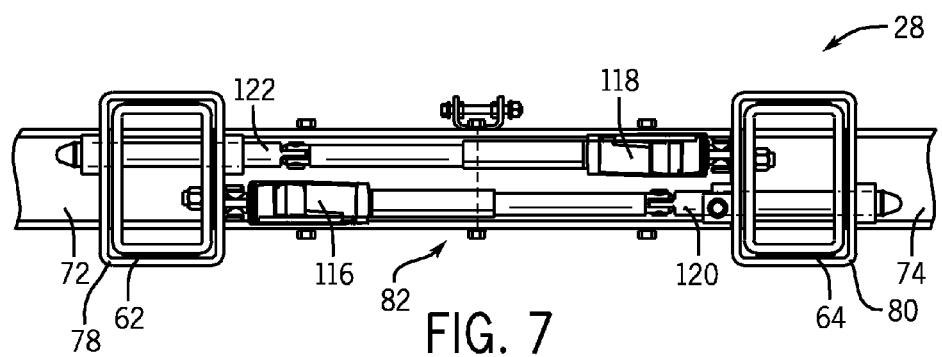

SYSTEM AND METHOD FOR CHANGING A LID HEIGHT OF A HARVESTER

BACKGROUND

The invention relates generally to harvesters and, more particularly, to a system and method for changing a lid height of a harvester.

A harvester may be used to harvest agricultural crops, such as barley, beans, beets, carrots, corn, cotton, flax, oats, potatoes, rye, soybeans, and wheat. Certain harvesters, such as cotton harvesters, are uniquely designed to harvest a specific crop. For example, a cotton harvester typically includes row units on its front end for picking cotton from plants. While harvesting cotton, the cotton is picked from the plants and conveyed to a crop receiving structure of the harvester. The crop receiving structure typically includes a compactor for compacting cotton. When the crop receiving structure is full, the crop receiving structure unloads the compacted cotton.

Certain road safety requirements may place height restrictions on vehicles (e.g., agricultural vehicles) traveling on roads. Accordingly, a top (e.g., lid) of a cotton harvester may be positioned at different heights depending on where the cotton harvester will travel. For example, the top of the cotton harvester may be positioned at a harvesting height for harvesting cotton in a field. Furthermore, the top of the cotton harvester may be positioned at a field transport height for moving the harvester on a public road (e.g., to another part of a field, from one field to another, etc.). Moreover, the top of the cotton harvester may be positioned at a truck transport height for transporting the harvester via a truck (e.g., the harvester is driven onto a truck and is carried by the truck to another location). Unfortunately, it may be difficult, time consuming, and/or use multiple manual steps to position the top of the cotton harvester at different heights.

BRIEF DESCRIPTION

In one embodiment, a harvester includes a crop receiver configured to receive agricultural material. The crop receiver includes a lid to cover a portion of the crop receiver. The harvester also includes a frame assembly coupled to the lid of the crop receiver. The harvester includes an actuator coupled to the frame assembly and configured to be controlled to adjust a vertical height of the lid. The harvester also includes a sensor coupled to the frame assembly and configured to indicate whether the lid is positioned at a first vertical height or a second vertical height. The harvester includes control circuitry coupled to the sensor and configured to instruct the actuator to move the lid of the crop receiver between the first vertical height and the second vertical height based at least partly on an indication from the sensor.

In another embodiment, a method for transitioning a lid of a harvester from a first position to a second position includes receiving an indication at control circuitry of the harvester that the lid is to transition from the first position to the second position. The method also includes adjusting a position of the lid from the first position toward the second position based on the indication using the control circuitry. The method includes detecting the position of the lid using the control circuitry to determine when the lid reaches the second position. The method also includes maintaining the position of the lid using the control circuitry after the lid has reached the second position.

In another embodiment, a harvester includes a crop receiver configured to receive agricultural material. The crop receiver includes a lid to cover a portion of the crop receiver. The harvester also includes a frame assembly having a first guide post, a second guide post, an M-frame, a T-frame, and a sensor. The first guide post, the second guide post, and a top-cross bar of the T-frame are coupled to the lid of the crop receiver. The sensor is configured to detect a position of a vertical bar of the T-frame relative to a sleeve of the M-frame.

DRAWINGS

These and other features, aspects, and advantages of the present invention will become better understood when the following detailed description is read with reference to the accompanying drawings in which like characters represent like parts throughout the drawings, wherein:

FIG. 6 is a perspective view of a portion of a frame assembly of the cotton harvester of FIG. 1, illustrating an embodiment of a locking assembly for locking portions of the frame assembly to one another;

FIG. 7 is a top view of the locking assembly of FIG. 6, illustrating actuators coupled to the frame assembly for locking portions of the frame assembly to one another.

DETAILED DESCRIPTION

Figure 1:
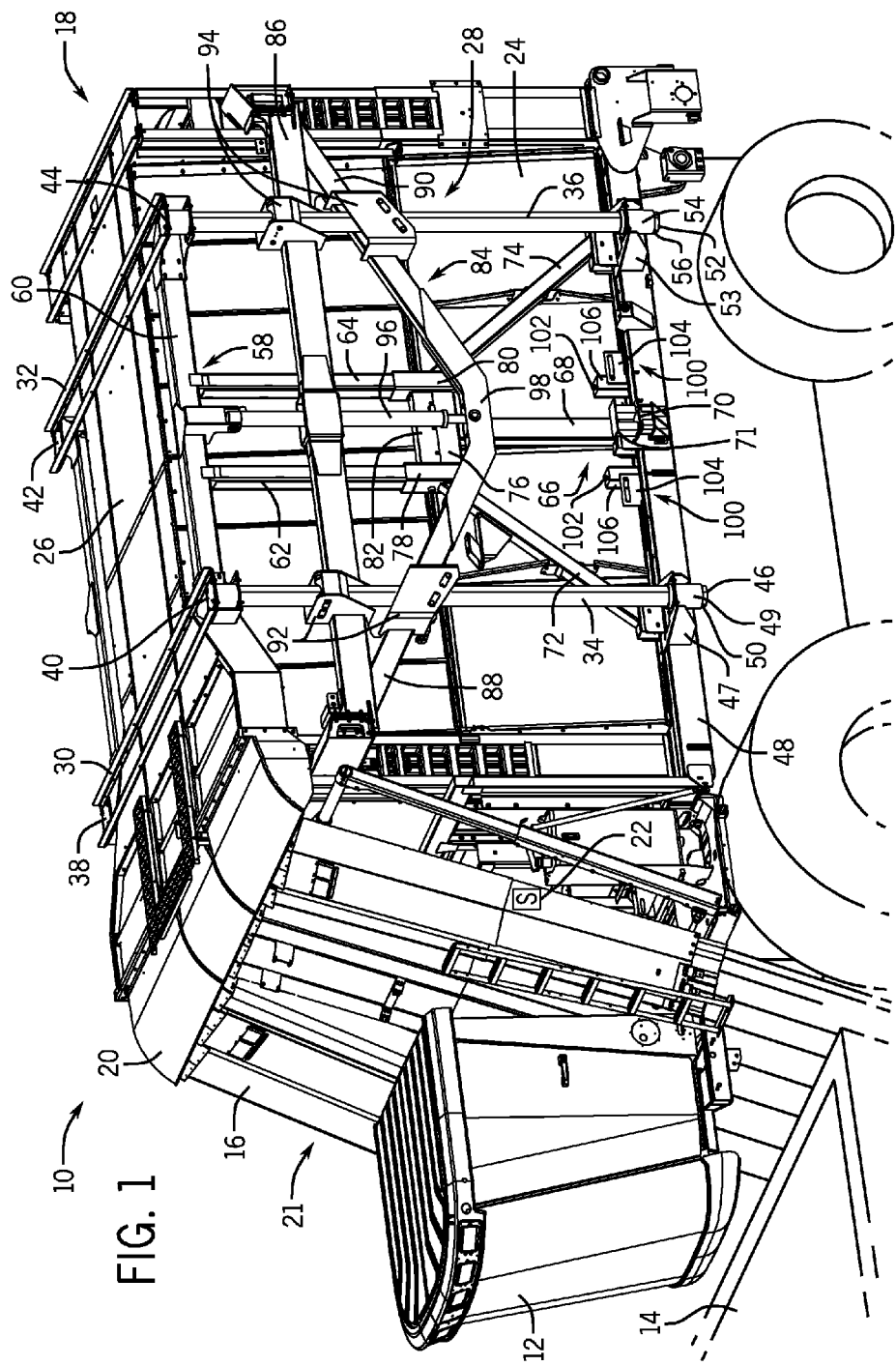
FIG. 1 is a perspective view of an embodiment of a cotton harvester including a sensor configured to indicate a height of a top of the cotton harvester.

Turning now to the drawings, FIG. 1 is a perspective view of a harvester 10 (e.g., cotton harvester) designed to remove cotton from cotton plants and to pack the cotton into bales. As discussed in detail below, the harvester 10 may be configured to transition between various modes (e.g., harvest, field transport, truck transport), and thereby change the height of the harvester 10. Furthermore, the harvester 10 may use a control system and one or more sensors to control the transition between the various modes so that minimal operator (e.g., human) interaction (e.g., intervention) is used. For example, an operator may use the control system to make a selection to transition the harvester 10 from the harvest mode to the field transport mode. After making the selection, the harvester 10 may transition from the harvest mode to the field transport mode without any additional operator interaction. As another example, an operator may use the control system to make a selection to transition the harvester 10 from the field transport mode to the harvest mode. After making the selection, the harvester 10 may transition from the field transport mode to the harvest mode without any additional operator interaction. Accordingly, time and labor used to transition the harvester 10 between different modes may be reduced, resulting in more efficient use of the harvester 10.

As illustrated, the harvester 10 includes a cab 12 that may provide an enclosure for an operator of the harvester 10. As may be appreciated, various controls may be located within the cab 12 for operation of the harvester 10. The harvester 10 also includes harvesting row units 14 for harvesting cotton from plants (e.g., picking cotton from plants) as the harvester 10 moves through a field. During operation of the harvester 10, harvested cotton is conveyed by air ducts 16 (e.g., telescoping chutes) into a receiver 18 (e.g., crop receiver, cotton receiver, etc.) where the cotton is received, compacted, and formed into bales. As illustrated, hoods 20 may be used to direct the harvested cotton from the air ducts 16 to the receiver 18.

In the illustrated embodiment, the air ducts 16 are in a raised position 21, however, as the harvester 10 transitions between its various modes, the air ducts 16 may be retracted to one or more lowered positions. A position sensor 22 is mounted to the air ducts 16 and may provide an indication (e.g., to control circuitry) regarding whether the air ducts 16 are in the raised position 21 or a lowered position. For example, in certain embodiments, the position sensor 22 may include a plunger switch, or any other suitable switch. Furthermore, the position sensor 22 may include any suitable sensor that may detect whether the air ducts 16 are in the raised position 21 and/or a lowered position. For example, the position sensor 22 may be a pressure sensor, light sensor, accelerometer, and so forth.

The receiver 18 includes an enclosure bottom 24 (e.g., chamber floor, chamber walls) and an enclosure top 26 (e.g., lid) for receiving the cotton and holding the cotton within the harvester 10. The enclosure top 26 and the enclosure bottom 24 are attached to and supported by a frame assembly 28. Specifically, the enclosure top 26 includes horizontal support members 30 and 32 that each extend from one side of the enclosure top 26 to another side of the enclosure top 26. The enclosure top 26 may be coupled to the horizontal support members 30 and 32 in any suitable manner (e.g., via bolts, pins, screws, welded connection, bonded connection, etc.). The horizontal support members 30 and 32 are coupled to guide posts 34 and 36 of the frame assembly 28, respectively. Furthermore, the horizontal support members 30 and 32 may be coupled to guide posts on the opposite side of the harvester 10. Specifically, the horizontal support member 30 has a first end 38 and a second end 40 that are each coupled to guide posts. Furthermore, the horizontal support member 32 has a first end 42 and a second end 44 that are each coupled to guide posts. As illustrated, the second end 40 of the horizontal support member 30 is coupled to a first end of the guide post 34, and the second end 44 of the horizontal support member 32 is coupled to a first end of the guide post 36. As may be appreciated, the horizontal support members 30 and 32 may be coupled to the guide posts 36 in any suitable manner (e.g., via bolts, pins, screws, welded connection, bonded connection, etc.).

The guide post 34 includes a second end 46 that extends through a bracket 47. As illustrated, the bracket 47 is coupled to a floor support beam 48 configured to support the enclosure bottom 24. Moreover, a compactor cup 49 is disposed on the second end 46 of the guide post 34 below the bracket 47 to position the guide post 34 (e.g., keep it centered). Furthermore, a stop 50 (e.g., bolt, pin, etc.) is inserted through the guide post 34 to block the guide post 34 from being lifted vertically upward out of the bracket 47. Likewise, the guide post 36 includes a second end 52 that extends through a bracket 53. The bracket 53 is coupled to the floor support beam 48. Moreover, a compactor cup 54 is disposed on the second end 52 of the guide post 36 below the bracket 53 to position the guide post 36 (e.g., keep it centered). Furthermore, a stop 56 (e.g., bolt, pin, etc.) is inserted through the guide post 36 to block the guide post 36 from being lifted vertically upward out of the bracket 53. Accordingly, with the stops 50 and 56 attached to the guide posts 34 and 36 respectively, each of the guide posts 34 and 36 may slide vertically downward through their respective brackets 47 and 53, but are blocked from sliding vertically upward through their respective brackets 47 and 53.

The frame assembly 28 includes a T-frame 58 coupled to the enclosure top 26 and configured to move the enclosure top 26 vertically. Specifically, the T-frame 58 includes a top cross-bar 60 that is coupled to the second end 40 of the horizontal support member 30 and to the second end 44 of the horizontal support member 32. The horizontal support members 30 and 32 may be coupled to the top cross-bar 60 in any suitable manner (e.g., via bolts, pins, screws, welded connection, bonded connection, etc.). The T-frame 58 also includes two vertical bars 62 and 64. The vertical bars 62 and 64 are positioned within openings of an M-frame 66, and are configured to be selectively translated relative to the M-frame 66 to raise and/or lower the enclosure top 26.

As illustrated, the M-frame 66 includes a vertical center support member 68 coupled to the floor support beam 48. Furthermore, a center stop 70 is positioned at the junction of the vertical center support member 68 and the floor support beam 48. In addition, a compactor stop 71 is positioned adjacent to the center stop 70, as illustrated. The M-frame 66 also includes angled support members 72 and 74 that are coupled to the floor support beam 48. The vertical center support member 68 and the angled support members 72 and 74 are coupled to a horizontal center support member 76. A sleeve 78 is disposed between the angled support member 72 and the horizontal center support member 76. Furthermore, a sleeve 80 is disposed between the angled support member 74 and the horizontal center support member 76. As discussed above, the vertical bars 62 and 64 are positioned within openings of the sleeves 78 and 80 of the M-frame 66, and are configured to be selectively translated relative to the M-frame 66 to raise and/or lower the enclosure top 26.

One or more pins, or other devices, may be used to lock the vertical bars 62 and 64 to the sleeves 78 and 80. Accordingly, in the present embodiment, a locking assembly 82 may include one or more pins (or any suitable locking device) that are configured to selectively lock the vertical bars 62 and 64 to the sleeves 78 and 80, respectively. As illustrated, the locking assembly 82 includes a housing to enclose the locking mechanism. Furthermore, in some embodiments, the locking assembly 82 may include linear actuators that are controlled to selectively extend and/or retract pins that are inserted through the vertical bars 62 and 64 and the sleeves 78 and 80 to lock components to one another.

The frame assembly 28 also includes a compactor frame 84 that may be selectively driven to compact agricultural product received by the receiver 18. As illustrated, the compactor frame 84 includes a cross-bar 86 coupled to a pair of braces 88 and 90. A first set of rollers 92 slidably attaches the compactor frame 84 to the guide post 34, and a second set of rollers 94 slidably attaches the compactor frame 84 to the guide post 36. The first and second sets of rollers 92 and 94 enable the compactor frame 84 to slide (e.g., roll) vertically upward and/or downward along the guide posts 34 and 36. As may be appreciated, when the compactor frame 84 moves vertically downward cotton within the receiver 18 may be compressed (e.g., packed) into a bale. Conversely, when the compactor frame 84 moves vertically upward a downward force may be removed from the cotton (e.g., for unloading a bale of cotton from the harvester 10).

An actuator 96 extends between the top cross-bar 60 and a center portion 98 of the compactor frame 84. The actuator 96 is configured to drive the compactor frame 84 vertically downward when extended, thereby compacting cotton. Furthermore, the actuator 96 is configured to drive the compactor frame 84 vertically upward when retracted.

The frame assembly 28 includes stop assemblies 100 coupled to the floor support beam 48. The stop assemblies 100 include sensors 102 used to sense when the harvester 10 is in the field transport mode by determining whether the vertical bars 62 and 64 contact the sensors 102. Based at least partially on sensing whether the harvester 10 is in the field transport mode, the harvester 10 may be able to transition between the harvest mode, the field transport mode, and/or the truck transport mode with little or no operator interaction during the transition.

The sensor 102 may be any suitable sensor for detecting contact between the vertical bars 62 and 64 and the sensors 102. For example, the sensors 102 may be switches (e.g., plunger switches), pressure sensors, touch sensors, and so forth. In other embodiments, the sensors 102 may be arranged in a different position and may sense any portion of the harvester 10 to determine which mode the harvester 10 is in (e.g., the lid height of the harvester 10) and/or what modes (e.g., lid heights) the harvester 10 is transitioning between.

The stop assemblies 100 each include a fixed portion 104 that is coupled to the floor support beam 48, and configured to remain in a fixed position during operation of the harvester 10. Furthermore, the stop assemblies 100 each include a movable stop 106 configured to slidably move between a position adjacent to the fixed portion 104 and a position horizontally within the fixed portion 104. The movable stops 106 are configured to move to different positions based on the mode of the harvester 10, as explained in detail below.

By using the frame assembly 28 as described herein, the harvester 10 may be able to transition between the harvest mode and the field transport mode (e.g., changing the overall height of the harvester 10) without operator interaction during the transition (e.g., after the transition has been initiated). Furthermore, the harvester 10 may be able to transition between the field transport mode and the truck transport mode (e.g., changing the overall height of the harvester 10) with limited operator intervention during the transition. Accordingly, the process of changing the overall height of the harvester 10 may be simplified, thereby reducing the time and the number of steps involved in adjusting the overall height of the harvester 10.

Figure 2:
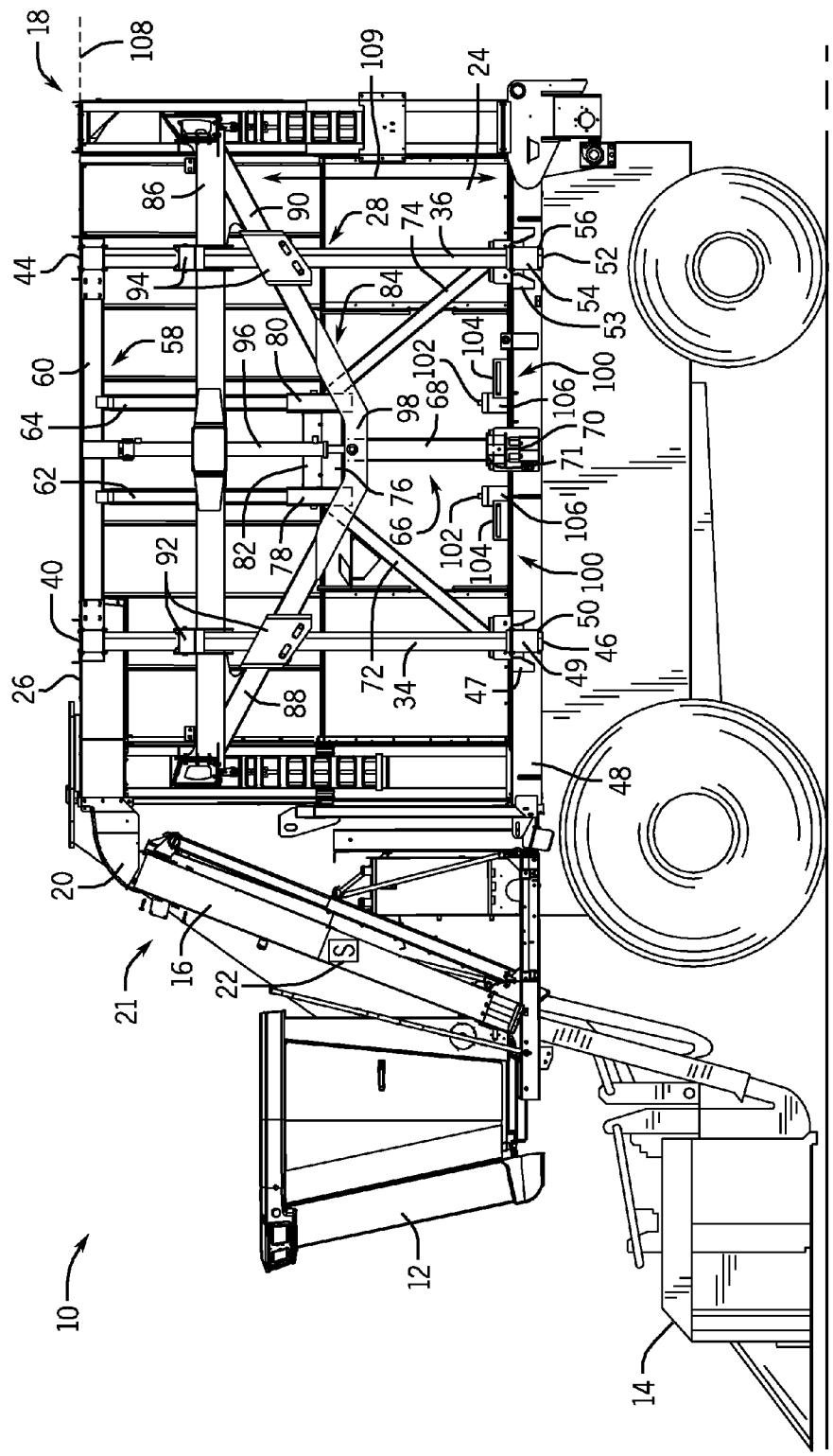
FIG. 2 is a side view of the cotton harvester of FIG. 1, with the top of the cotton harvester positioned in a harvest mode, and a compactor frame in an operating position.
Figure 3:
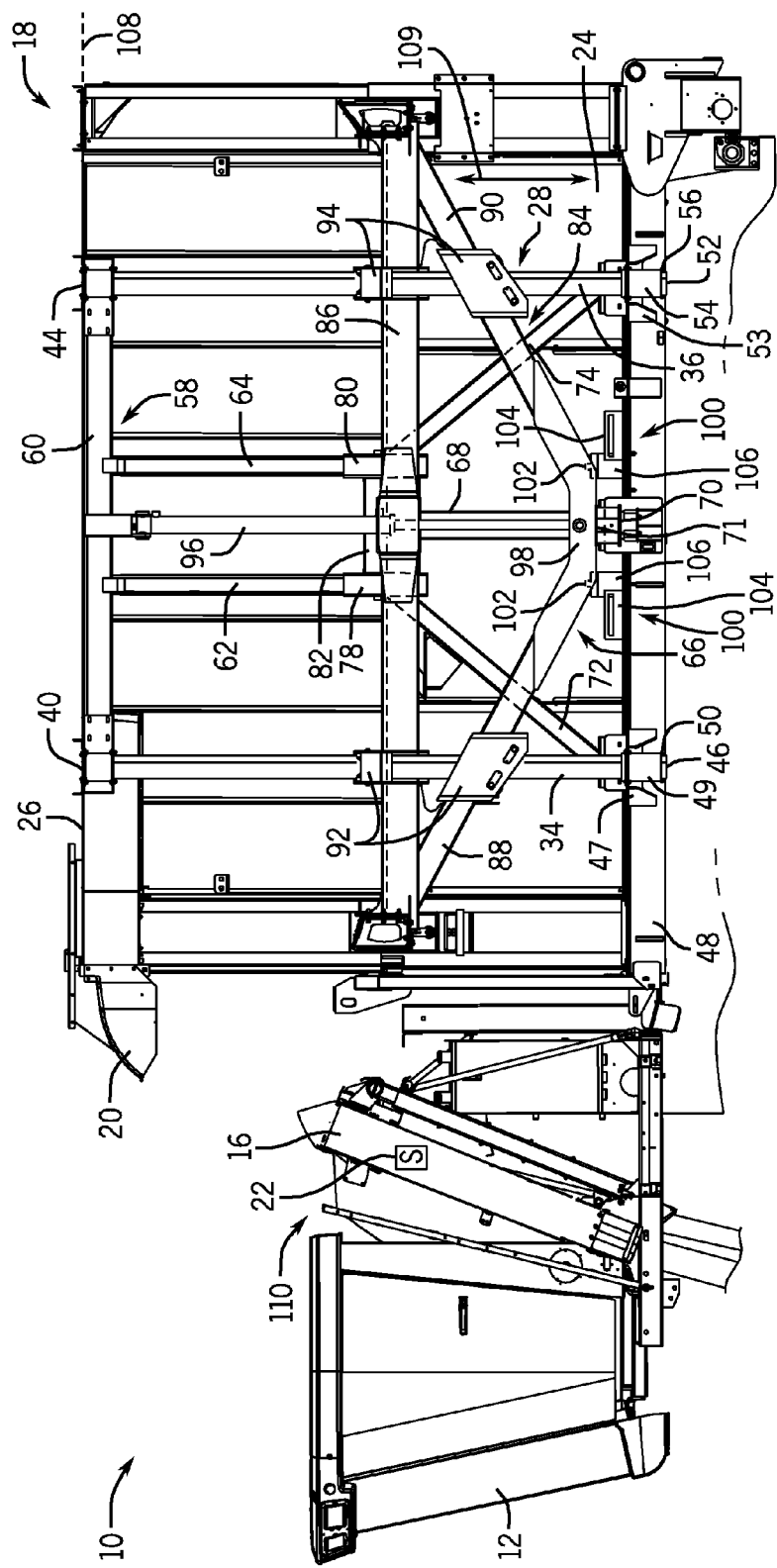
FIG. 3 is a side view of the cotton harvester of FIG. 1, with the top of the cotton harvester positioned in a harvest mode, and a compactor frame in an intermediate position.
Figure 4:
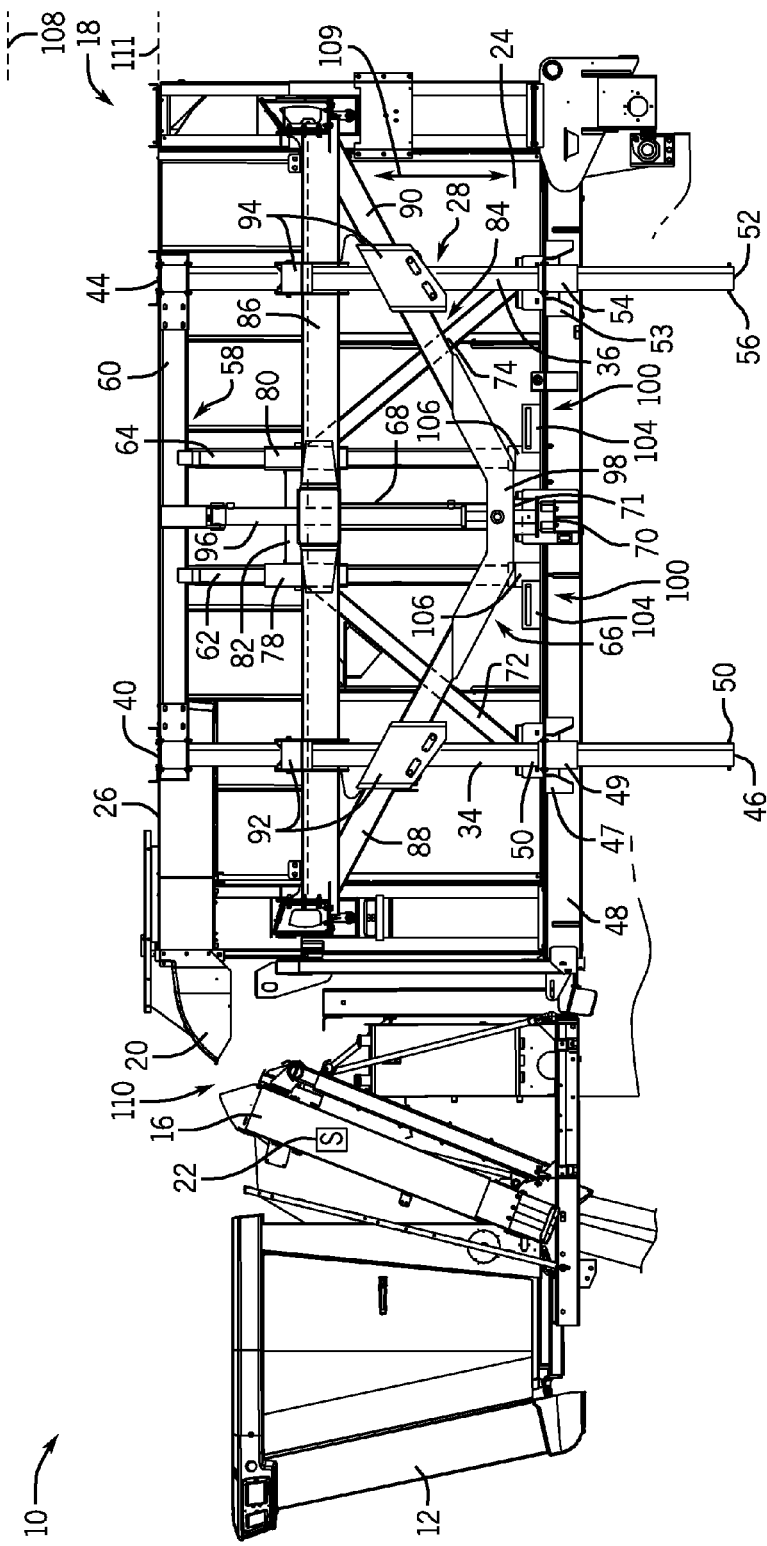
FIG. 4 is a side view of the cotton harvester of FIG. 1, with the top of the cotton harvester positioned in a field transport mode.
Figure 5:
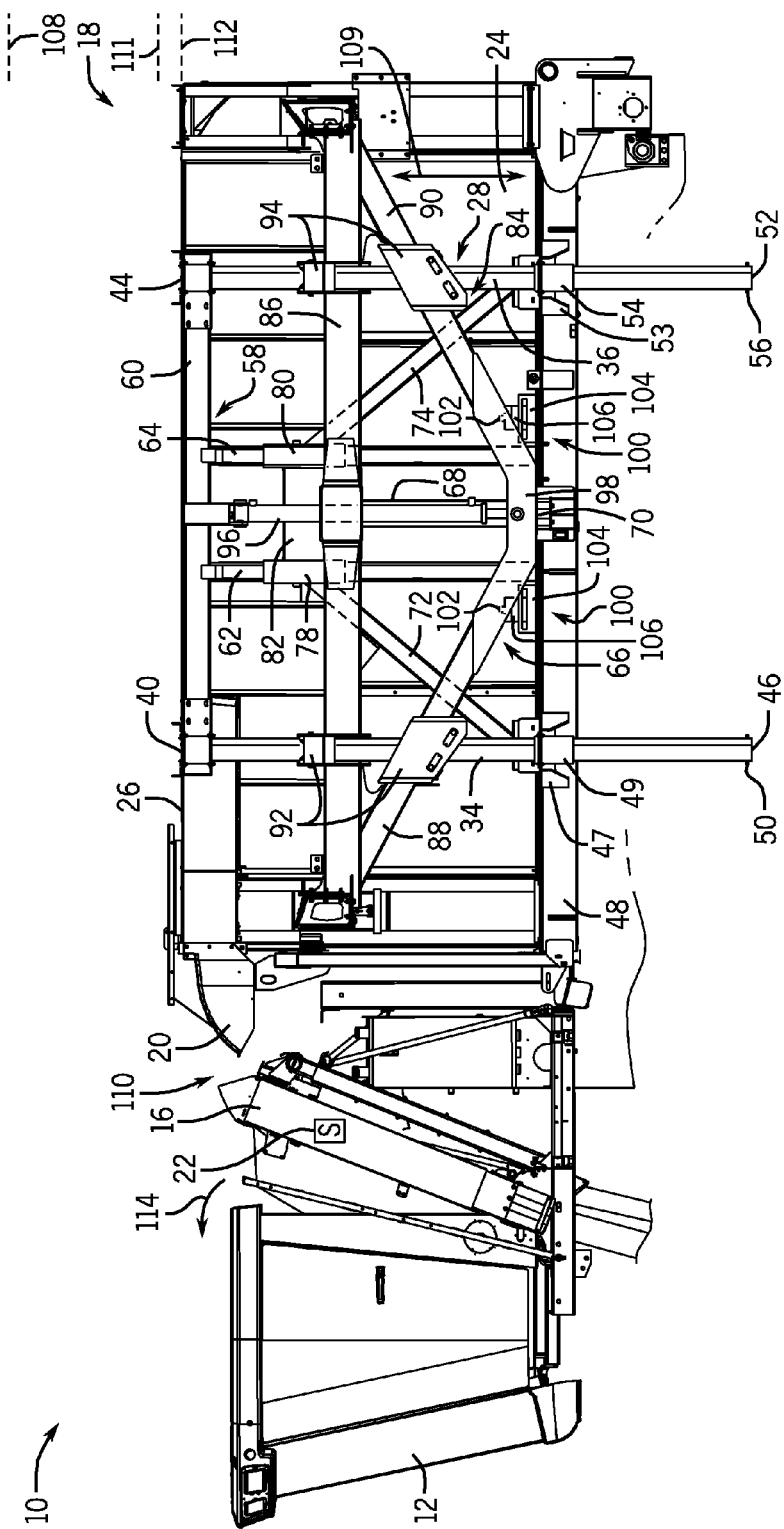
FIG. 5 is a side view of the cotton harvester of FIG. 1, with the top of the cotton harvester positioned in a truck transport mode.

The following FIGS. 2 through 5 illustrate embodiments of the transition of the harvester 10 between the various modes. For example, FIGS. 2 through 4 illustrate the transition of the harvester 10 from the harvest mode to the field transport mode. Furthermore, FIGS. 4 through 5 illustrate the transition of the harvester 10 from the field transport mode to the truck transport mode.

Accordingly, FIG. 2 is a side view of the cotton harvester 10 of FIG. 1, with the top of the harvester 10 positioned in the harvest mode and the compactor frame 84 in an operating position. In the harvest mode, the top of the harvester 10 (e.g., uppermost part of the enclosure top 26) is at a height 108, as illustrated. As may be appreciated, the compactor frame 84 may move vertically upward and/or downward, as illustrated by arrows 109. During operation, to transition from the harvest mode to the field transport mode (e.g., field-to-field transport mode) an operator of the harvester 10 may provide an input to control circuitry to initiate the transition (e.g., via an input device in the cab 12, such as a touchscreen display). The control circuitry (e.g., one or more control modules (XCMs)) may detect that the harvester 10 is in the harvest mode by detecting a status of the locking assembly 82. For example, the control circuitry may detect whether linear actuators of the locking assembly 82 have a pin extended or retracted. As such, an extended pin may indicate that the M-frame 66 is locked to the T-frame 58 and, therefore, the harvester 10 is in the harvest mode. Conversely, a retracted pin may indicate that the M-frame 66 is not locked to the T-frame 58 and, therefore, the harvester 10 is not in the harvest mode. Accordingly, the control circuitry may detect whether the harvester 10 is in the harvest mode.

If the control circuitry determines that the harvester 10 is in the harvest mode, the control circuitry may activate an audio device (e.g., speaker) to provide notification that the harvester 10 is moving. The audio device may remain activated until the harvester 10 stops moving (e.g., the control circuitry may activate a back up alarm sound until the harvester 10 movement is complete). Thereafter, the control circuitry may lower the air ducts 16 to a lowered position 110, as illustrated in FIG. 3. FIG. 3 is a side view of the harvester 10, with the top of the harvester 10 still positioned in the harvest mode (e.g., at height 108); however, the compactor frame 84 is in an intermediate position, and the air ducts 16 are lowered.

The control circuitry may receive an indication from the position sensor 18 indicative of whether the air ducts 16 are in the lowered position. As such, after the control circuitry receives the indication from the position sensor 18, the harvester 10 may open a primary rear door and a secondary rear door of the harvester 10 so that a tailgate of the harvester 10 may move freely. Thereafter, the actuator 96 is extended to direct the compactor frame 84 toward the bottom of the receiver 18, as illustrated. The actuator 96 is extended so that the compactor frame 84 contacts the compactor stop 71. Moreover, the actuator 96 continues to extend to exert force against the compactor stop 71, thereby slightly lifting the enclosure top 26 and relieving tension on the locking assembly 82. As will be appreciated, in certain embodiments, the actuator 96 may extend until actuator 96 stops are reached.

Thus, with the force removed from the locking assembly 82, the control circuitry may use the locking assembly 82 to unlock the T-frame 58 from the M-frame 66. Accordingly, with the T-frame 58 unlocked from the M-frame 66, the actuator 96 may be retracted to lower the enclosure top 26 to a height 111, as illustrated in FIG. 4. At the height 111, the top of the harvester 10 may be positioned in the field transport mode. While the actuator 96 is being retracted, the two vertical bars 62 and 64 slide downwardly through the sleeves 78 and 80. Moreover, the control circuitry receives feedback from the sensors 102 upon contact between the two vertical bars 62 and 64 and the sensors 102 (e.g., when the enclosure top 26 reaches the height 111). As such, the control circuitry may determine when the height 111 of the harvester 10 is proper for the field transport mode. Thereafter, the control circuitry may complete the transition to the field transport mode by closing the primary rear door and the secondary rear door. As may be appreciated, transition from the field transport mode to the harvest mode may be accomplished by performing the previously described steps in a reverse order. Accordingly, the harvester 10 may transition from the harvest mode to the field transport mode with no operator interaction after the operator initiates the transition, thereby resulting in a faster transition time between the modes.

FIG. 5 is a side view of the harvester 10 of FIG. 1, with the top of the harvester 10 positioned in a truck transport mode (e.g., at a height 112). The harvester 10 may transition from the harvest mode to the truck transport mode in a variety of ways. In one embodiment, the harvester 10 first transitions from the harvest mode to the field transport mode. Then, an operator removes a portion of each hood 20 (e.g., center inlet floor hood). The air ducts 16 are then moved forward in the direction 114, as illustrated. The operator may then raise the compactor frame 84 (e.g., manually using a compactor toggle button). The operator then removes the compactor stop 71 (e.g., from both sides of the harvester 10). Thereafter, the compactor frame 84 is lowered down to contact the floor support beam 48. Moreover, the actuator 96 is extended to raise the T-frame 58 off of the stop assemblies 100. The movable stops 106 are then moved to be positioned horizontally within the fixed portions 104 (e.g., via loosening bolts, sliding the moveable stops 106, and tighten the bolts to lock the movable stops 106 within the fixed portions 104). The actuator 96 is then retracted to lower the T-frame 58 to the stops, such that the height 112 of the harvester 10 is attained. It should be noted that the control circuitry may be able to determine that the harvester 10 is in the truck transport position because of indications received from the locking assembly 82 indicating that the locking assembly 82 is in an unlocked state, and indications received from the sensors 102 indicating that the sensors 102 do not detect contact with the two vertical bars 62 and 64. As may be appreciated, the harvester 10 may be transitioned from the truck transport mode to the harvest mode by performing the previously described steps in a reverse order. Accordingly, the harvester 10 may transition from the harvest mode to the truck transport mode with limited operator interaction, resulting in faster transition time between the modes.

FIG. 6 is a perspective view of a portion of the frame assembly 28 of the harvester 10 of FIG. 1, illustrating an embodiment of the locking assembly 82 for locking portions of the frame assembly 28 to one another. The locking assembly 82 is illustrated with a housing of the locking assembly 82 removed for clarity. Moreover, the locking assembly 82 includes a first actuator 116 and a second actuator 118. As illustrated, the first actuator 116 includes a first pin 120 that is configured to be extended to lock the sleeve 80 to the vertical bar 64, and to be retracted to unlock the sleeve 80 from the vertical bar 64. As previously discussed, when the sleeve 80 is unlocked from the vertical bar 64, the vertical bar 64 may move vertically within the sleeve 80. Furthermore, the second actuator 118 includes a second pin 122 that is configured to be extended to lock the sleeve 78 to the vertical bar 62, and to be retracted to unlock the sleeve 78 from the vertical bar 62. As such, when the sleeve 78 is unlocked from the vertical bar 62, the vertical bar 62 may move vertically within the sleeve 78.

Although the first and second actuators 116 and 118 are illustrated as being linear actuators, the locking assembly 82 may include any suitable locking device. For example, the locking assembly 82 may include hydraulic actuators, solenoids, motors, and so forth. In some embodiments, the actuators 116 and 118 may be configured to sense their respective positions (e.g., extended, retracted, partially extended) and provide an indication of their respective positions to the control circuitry. Accordingly, the control circuitry may detect the position of the actuators 116 and 118 to determine whether the vertical bars 62 and 64 are locked to the sleeves 78 and 80. Furthermore, the control circuitry may be used to lock and/or unlock the vertical bars 62 and 64 to the sleeves 78 and 80. Therefore, the control circuitry may provide control so that operator interaction is not needed for such operations.

FIG. 7 is a top view of the locking assembly 82 of FIG. 6, illustrating the actuators 116 and 118 coupled to the frame assembly 28. The pin 120 of the actuator 116 is configured to extend through the vertical bar 64 and the sleeve 80 to lock the vertical bar 64 to the sleeve 80, as illustrated. Furthermore, the pin 122 of the actuator 118 is configured to extend through the vertical bar 62 and the sleeve 78 to lock the vertical bar 64 to the sleeve 78.

Figure 8:
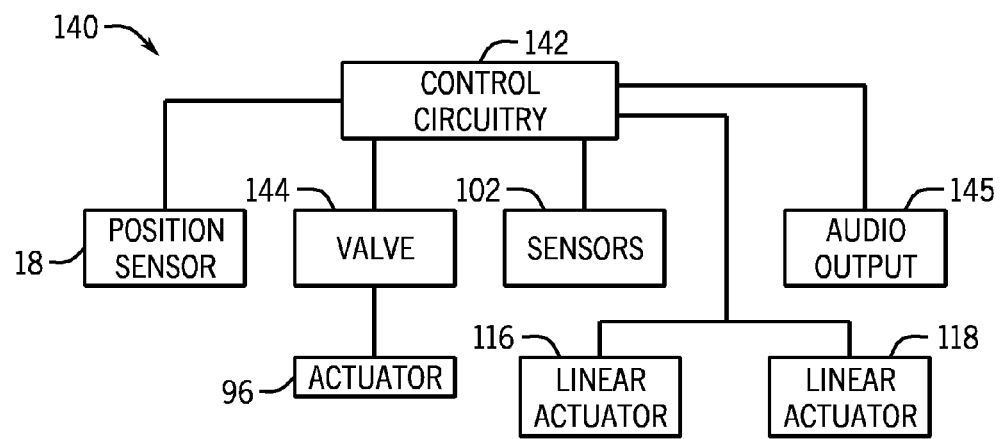
FIG. 8 is a block diagram of a control system for transitioning the top of the harvester between various positions.

FIG. 8 is a block diagram of a control system 140 for transitioning the top of the harvester 10 between various positions. The control system 140 includes control circuitry 142 to control operation of the harvester 10, and to automate (e.g., perform functions without operator interaction) transition of the harvester 10 between different modes. As may be appreciated, the control circuitry 142 may include one or more control modules. In the illustrated embodiment, the control circuitry 142 is coupled to the air duct position sensor 18, and configured to receive an indication from the position sensor 18 of whether the air ducts 16 are in an extended or retracted position. The control circuitry 142 is also coupled to the sensors 102, and configured to receive an indication from the sensors 102 of whether the frame assembly 28 is in the field transport mode. Moreover, the control circuitry 142 is coupled to the actuators 116 and 118 (e.g., linear actuators) and configured to control the extension and/or retraction of the pins 120 and 122. The control circuitry 142 is also configured to receive indications from the actuators 116 and 118 that indicate whether the pins 120 and 122 are extended and/or retracted.

Furthermore, the control circuitry 142 is coupled to a valve 144 that is used to control the actuator 96. Specifically, the valve 144 may be used to control an amount of hydraulic fluid flowing to/from the actuator 96. As may be appreciated, the valve 144 may be any suitable valve. In certain embodiments, the valve 144 may be a pulse-width modulation (PWM) valve to control the position of the actuator 96 with a high degree of accuracy. The control circuitry 142 is also coupled to an audio output device 145 (e.g., speaker) to provide audio signals to an operator. As disclosed herein, the control circuitry 142 may be used to completely and/or partially automate the transition of the harvester 10 from the harvest mode to the field transport mode. In addition, the control circuitry 142 may be used to completely and/or partially automate the transition of the harvester 10 from the harvest mode to the truck transport mode. Accordingly, in certain embodiments, the time utilized to transition between modes may be reduced from a time of approximately 20 to 60 minutes to a time of approximately 2 to 10 minutes. As such, efficient use of the harvester 10 may be increased.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:
1. A harvester comprising:
a crop receiver configured to receive agricultural material, wherein the crop receiver comprises a lid to cover a portion of the crop receiver;
a frame assembly coupled to the lid of the crop receiver;
an actuator coupled to the frame assembly and configured to be controlled to adjust a vertical height of the lid;
a sensor coupled to the frame assembly and configured to indicate whether the lid is positioned at a first vertical height or a second vertical height; and
control circuitry coupled to the sensor and configured to instruct the actuator to move the lid of the crop receiver between the first vertical height and the second vertical height based at least partly on an indication from the sensor wherein the frame assembly comprises a plurality of posts and a compactor frame configured to move along the posts, wherein the compactor frame is selectively driven to compact agricultural product received by the crop receiver.

2. The harvester of claim 1, wherein the lid is directly coupled to a first end of each guide post.

3. The harvester of claim 1, wherein the frame assembly comprises a stop coupled to a second end of each of the guide posts to block upward movement of the guide posts.

4. The harvester of claim 1, wherein the actuator is coupled to the compactor frame and configured to drive the compactor frame to compact the agricultural material received by the crop receiver.

5. The harvester of claim 4, comprising a pulse-width modulation valve configured to control the actuator.

6. The harvester of claim 1, wherein the sensor comprises a switch.

7. The harvester of claim 1, wherein the sensor comprises a plunger switch.

8. The harvester of claim 1, comprising a plurality of telescoping chutes configured to direct the agricultural material to the crop receiver, wherein the telescoping chutes comprise a position sensor configured to detect whether the telescoping chutes are in a raised position or a lowered position.

9. The harvester of claim 8, wherein the control circuitry is configured to receive an indication from the position sensor to determine whether the telescoping chutes are in the raised position or in the lowered position.

10. A harvester comprising:
a crop receiver configured to receive agricultural material, wherein the crop receiver comprises a lid to cover a portion of the crop receiver;
a frame assembly coupled to the lid of the crop receiver;
an actuator coupled to the frame assembly and configured to be controlled to adjust a vertical height of the lid;
a sensor coupled to the frame assembly and configured to indicate whether the lid is positioned at a first vertical height or a second vertical height;
control circuitry coupled to the sensor and configured to instruct the actuator to move the lid of the crop receiver between the first vertical height and the second vertical height based at least partly on an indication from the sensor; and
wherein the frame assembly comprises a T-frame structure slidably coupled to an M-frame structure, and wherein the T-frame structure comprises a top cross-bar coupled to the lid of the crop receiver and two vertical bars configured to selectively slide within sleeves of the M-frame structure.

11. The harvester of claim 10, wherein the control circuitry is configured to selectively control insertion of a pin through openings in the two vertical bars of the T-frame structure and openings in the sleeves of the M-frame structure to block movement of the T-frame structure relative to the M-frame structure.

12. The harvester of claim 11, comprising a second actuator coupled to the pin and configured to insert the pin through the openings in the two vertical bars of the T-frame structure and the openings in the sleeves of the M-frame structure to block movement of the T-frame structure relative to the M-frame structure, and to remove the pin from the openings in the two vertical bars of the T-frame structure and the openings in the sleeves of the M-frame structure to facilitate movement of the T-frame structure relative to the M-frame structure.

13. A method for transitioning a lid of a harvester from a first position to a second position comprising:
receiving an indication at control circuitry of the harvester that the lid is to transition from the first position to the second position;
adjusting a position of the lid from the first position toward the second position based on the indication using the control circuitry;
detecting the position of the lid using the control circuitry to determine when the lid reaches the second position; and
maintaining the position of the lid using the control circuitry after the lid has reached the second position; and
wherein adjusting the position of the lid from the first position toward the second position using the control circuitry comprises extending or retracting an actuator using the control circuitry.

14. The method of claim 13, comprising decoupling a T-frame of the harvester from an M-frame of the harvester using the control circuitry before adjusting the position of the lid from the first position toward the second position, wherein the lid is coupled to a top cross-bar of the T-frame and two vertical bars of the T-frame are configured to selectively slide within sleeves of the M-frame.

15. A harvester comprising:
a crop receiver configured to receive agricultural material, wherein the crop receiver comprises a lid to cover a portion of the crop receiver; and
a frame assembly comprising a first guide post, a second guide post, an M-frame, a T-frame, and a sensor, wherein the first guide post, the second guide post, and a top-cross bar of the T-frame are coupled to the lid of the crop receiver, and wherein the sensor is configured to detect a position of a vertical bar of the T-frame relative to a sleeve of the M-frame.

16. The harvester of claim 15, wherein the sensor is configured to provide an indication of whether the M-frame is aligned with the T-frame in a harvesting position, a field transport position, a truck transport position, or any combination thereof.

17. The harvester of claim 15, wherein the sleeve of the M-frame is selectively coupled to the vertical bar of the T-frame by a pin assembly, and the pin assembly is positioned using a linear actuator.

18. The harvester of claim 15, comprising control circuitry configured to transition the harvester between a harvesting position where the lid is at a first height and a field transport position where the lid is at a second height automatically.

* * * * *